US008622598B2

(12) United States Patent
Van Gorkom et al.

(10) Patent No.: US 8,622,598 B2
(45) Date of Patent: Jan. 7, 2014

(54) LIGHT EMITTING DEVICE AND LUMINAIRE (75) Inventors: Ramon Pascal Van Gorkom, Eindhoven (NL); Denis Joseph Carel Van Oers, Bocholt (BE)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 13/256,011

(22) PCT Filed: Mar. 8, 2010

(86) PCT No.: PCT/IB2010/050981
§ 371 (c)(1),
(2), (4) Date: Sep. 12, 2011

(87) PCT Pub. No.: WO2010/103450
PCT Pub. Date: Sep. 16, 2010

(65) Prior Publication Data
US 2012/0002435 A1  Jan. 5, 2012

(30) Foreign Application Priority Data
Mar. 12, 2009 (EP) .................................. 09154969

(51) Int. Cl.
*F21V 7/04*     (2006.01)
(52) U.S. Cl.
USPC ........................ 362/551; 362/147; 362/374
(58) Field of Classification Search
USPC ......... 362/551, 147–148, 154–282, 284, 288, 362/374–375, 322, 324
See application file for complete search history.

(56) References Cited

U.S. PATENT DOCUMENTS

| 5,161,883 | A | 11/1992 | Gordin et al. |
| 5,943,159 | A | 8/1999 | Zhu |
| 6,082,871 | A | 7/2000 | Yeh |
| 2001/0015896 | A1 | 8/2001 | Tsukamoto |
| 2003/0147254 | A1* | 8/2003 | Yoneda et al. ................. 362/551 |
| 2007/0058378 | A1 | 3/2007 | Moriyama et al. |
| 2008/0089085 | A1 | 4/2008 | Popelek |
| 2008/0198603 | A1 | 8/2008 | Sormani et al. |

FOREIGN PATENT DOCUMENTS

| DE | 385724 C | 11/1923 |
| EP | 1906078 A1 | 4/2008 |
| JP | 2004296249 A | 10/2004 |

* cited by examiner

*Primary Examiner* — Anne Hines
(74) *Attorney, Agent, or Firm* — John F. Salazar; Mark L. Beloborodov (57) ABSTRACT This invention relates to a light emitting device (100) having a movable collimating unit for adjusting the output direction of light being emitted from the light emitting device. The light emitting device comprises a base unit (110), and a light output unit (120) which is engaged with the base unit. The light output unit comprises at least one light source (121) for emitting light. The light emitting device further comprises a movably arranged collimating unit (130) for adjusting the direction of the emitted light, which is arranged such that it encompasses a light output portion (125), which is arranged on the light output unit.

12 Claims, 5 Drawing Sheets

FIG. 6b

LIGHT EMITTING DEVICE AND LUMINAIRE

FIELD OF THE INVENTION

The present invention relates to lighting, and more particularly to a light emitting device having a movable collimating unit for adjusting the output direction of light being emitted from the light emitting device.

BACKGROUND OF THE INVENTION

Recessed ceiling spots having adjustable direction of the emitted light are commonly used in lighting applications in shops, theatres, galleries, etc. Conventionally incandescent or CDM lamps, i.e. metal halide lamps employing a ceramic discharge tube in place of the usual quartz type, are typically used as light sources in such light emitting devices. These types of light sources requires bulky and heavy mechanical parts to enable an adjustable direction of light emitted from the device. The adjustment of the direction of light is typically achieved by means of tilting and rotating of the complete light emitting device. More recently light emitting diodes, LEDs, have entered into this field of lighting applications. When utilizing LEDs as light sources a similar problem as described above arises. The LEDs require cooling which is often achieved using relatively large and bulky heat sinks.

US 2008/0089085A1 discloses a headlamp for a motor vehicle having an adjustable light path direction. The utilized light source comprises a LED mounted onto a heat sink, which also forms part of a housing of the headlamp. Thus, the light source is arranged within the housing. Furthermore, a movable reflector is distantly arranged from the light source, such that at least a part of the light emitted from the light source is reflected towards a lens, through which light is outputted from the device.

SUMMARY OF THE INVENTION

It is an object of the present invention to provide a light emitting device that at least alleviates the above-mentioned drawbacks of the prior art.

Thus, in accordance with an aspect of the present invention, there is provided a light emitting device comprising a base unit, a light output unit which is engaged with the base unit, and which comprises at least one light source for emitting light, and a movably arranged collimating unit for adjusting the output direction of the emitted light. The light output unit comprises a light output portion for outputting light emitted from the light source. Furthermore, the collimating unit is arranged to encompass the light output portion.

Thus, a light emitting device is provided having a movably arranged collimating unit which encompasses a light output portion arranged on the light output unit. Substantially all light outputted from the light output portion is thus directly injected into the collimating unit, thereby allowing a high light output yield. The collimating unit collimates the light, and depending on the desired light beam direction, the movably arranged collimating unit is adjusted accordingly. Meanwhile, the position of the light output portion is kept fixed. With the present inventive concept a high flexibility of the angle of the light beam direction is provided. The collimating unit may be arranged such that the light rays outputted at the light output portion hits the collimator a limited amount of times, preferably 0 or 1 times. The invention further provides a simple mechanical construction, which provides a compact, light and cheap solution for the adjustment of the direction of the outputted light from the light emitting device. In addition, no housing is required to seal the light emitting device. Additionally having the cooling means on a set position or orientation can be advantageous because the cooling can be made more effective as the air flows around the device will always be oriented in the same direction. The at least one light source may be one of a light emitting diode, a laser, a CDM and an incandescent.

In accordance with an embodiment of the light emitting device, the light output portion is distanced from the base unit. Thus, the light output portion may advantageously be recessed, or even be fully built in, e.g. in a ceiling or a wall, while having the moving part and the light output portion arranged on the outside the ceiling or the wall. This provides for a good accessibility to the light output portion for maintenance. The light output portion is still connected to the base unit via the light unit. For the ease of a fully built-in base portion, the partitioning wall will have to be provided with a suitable aperture for the light output unit.

In accordance with an embodiment of the light emitting device, the collimating unit is arranged to be tiltable with respect to the light output unit and the base unit. Furthermore, the combination of the collimating unit, the base unit, and the light output unit is arranged to be rotatable. This allows for the light output portion to be rotated around a vertical axis with respect to the combination, while still having the same position within the movably arranged collimator. Having the base unit arranged to be rotatable around a vertical axis is advantageous because only the tilt mechanism between the base unit and the light output unit is then required. Depending on the arrangement of the light output portion, the rotation around the vertical axis may, in addition to the collimation of the collimating unit, slightly influence the appearance of the final outputted light distribution, and/or set the light beam direction.

In accordance with an embodiment of the light emitting device, the collimating unit is one of a truncated cone, cylinder shaped, square shaped, and triangular. The shape of the collimating unit may advantageously be arranged to influence the appearance of the light beam, or the angular light distribution, for the outputted light.

In accordance with an embodiment of the light emitting device, the base unit comprises a heat sink arranged for dissipating heat from the at least one light source.

In accordance with an embodiment of the light emitting device, the light output unit further comprises a mixing rod having a first end arranged at the at least one light source, and a second end forming the light output portion. With this arrangement, the light sources may be arranged directly onto a heat sink, thus increasing the efficiency of the cooling of the light sources. Also, because the light output portion is kept separated from the light sources, the risk for a user to burn himself on the light emitting device is decreased, as the light output is separated from the heat sources (light sources). The light mixing rod is further advantageous when employing light sources which emits a plurality of colors or when a smoothened light output profile is desired.

In accordance with an embodiment of the light emitting device, the second end is arranged to be one of cone shaped, pyramid shaped, and facetted. Thus, light from the light output surface may leave the light mixing rod from its vertical sides, and not just from a flat end facet. This provides a broadening of the light intensity distribution from the light output surface, which highly increases the amount of light that hits the inner surface of the collimating unit, i.e. less light exits the light emitting device directly without hitting the collimating unit. As a consequence, the length of the collimating unit may be decreased.

In accordance with an embodiment of the light emitting device, the device further comprises a light source fixture at which said at least one light source is arranged. Further, the light source fixture is arranged to form the light output portion. The light source fixture allows for a variety of arrangements of the light sources which is advantageous.

In accordance with an embodiment of the light emitting device, a plurality of the light sources are rotational symmetrically arranged on the light source fixture, which is advantageous for providing comparable light distributions in all directions.

In accordance with an embodiment of the light emitting device, a plurality of the light sources are arranged at least partly covering a surface of the light source fixture, wherein the light source fixture is arranged having the shape of one of a sphere, a pyramid, a rectangle, and a cone.

In accordance with an embodiment of the light emitting device, the movably arranged collimating unit comprises an aperture providing a predefined path for the movement of the collimating unit, which predefined path for the movement of the collimating unit is optionally asymmetric.

In accordance with an embodiment of the light emitting device, the light emitting device further comprises a reflector arranged at the base unit. This is advantageous for reflecting stray light through the aperture of the collimating unit and for improving the appearance of the lamp/luminaire.

In accordance with an embodiment of the light emitting device, the light emitting device further comprises a control unit for controlling the movement of the collimating unit, the amount of light, color of the light from the light emitting device, or combinations thereof.

In an alternative embodiment the base unit may be common to a plurality of light output units.

In accordance with an embodiment of the light emitting device, the base unit of is arranged to be shifted during movement of the collimating unit for adjusting the direction of the emitted light. The shifting of the position of the base unit is made in order to counterbalance a shifting of an area of the collimating unit from which the light exits the device. This area is referred to the light exit area, and is typically defined by an outer rim of the collimating unit If the collimating unit is moved to adjust the direction of the emitted light, for instance by means of tilting the collimating unit, the shifting of the light exit area of the collimating unit may be counterbalanced by simultaneously shifting the base with reference to the collimating unit, such that the total amplitude of the shifting of the exit area during adjustment of the direction of the light is decreased or totally counterbalanced. The direction of the outputted light may then be altered while still having a fixed position of the origin of the light output. This is also advantageous when optionally arranging the light emitting device in a recess in e.g. a ceiling. As the shifting of the light exit area is decreased, the recess may be decreased and the light emitting device may be better recessed in the surface.

These and other aspects, features, and advantages of the invention will be apparent from and elucidated with reference to the embodiments described hereinafter.

BRIEF DESCRIPTION OF THE DRAWINGS

The invention will now be described in more detail and with reference to the appended drawings in which.

DESCRIPTION OF PREFERRED EMBODIMENTS

Embodiments of the present invention will now be described more fully hereinafter and with reference to the accompanying drawings, in which certain embodiments of the invention are shown. This invention may, however, be embodied in many different forms and should not be considered as limited to the embodiments set forth herein. The embodiments are provided by way of example so that this disclosure will be thorough and complete, and will fully convey the scope of the invention to those skilled in the art. Like numbers refer to like elements throughout.

Figure 1A:
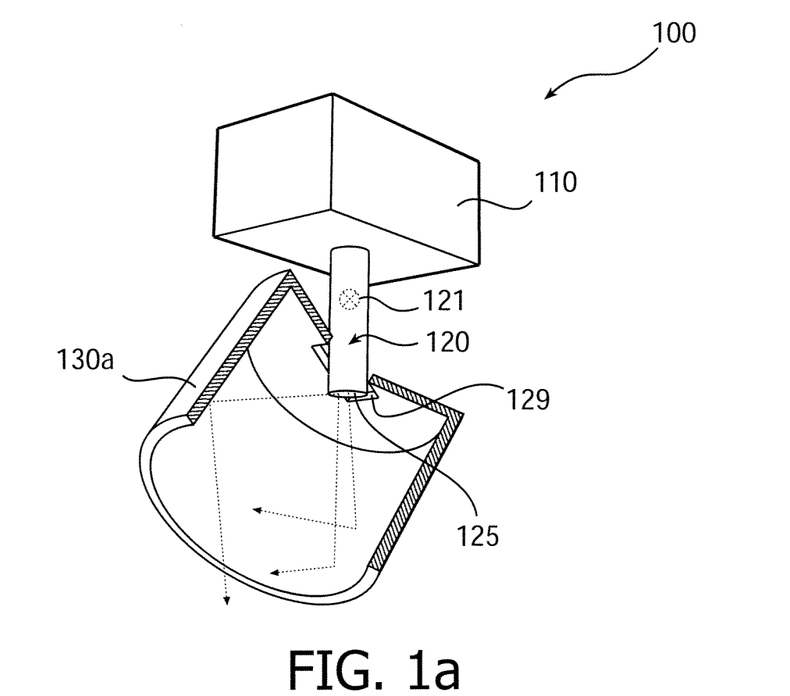
FIGS. 1a-b illustrate schematic cross-sectional views of two embodiments of a light emitting device according to the present invention.

FIG. 1a illustrates a schematic cross-sectional view of an exemplary embodiment of a light emitting device according to the present invention.

The light emitting device 100 comprises a base unit 110, a light output unit 120 having a first end engaged at the base unit 110 and comprising a light output surface 125 at an opposite end, and a movably arranged collimating unit 130a which is arranged to receive and adjust the direction of the light being outputted from the light output surface 125. The light exits the light emitting device via a light exit area of the collimating unit, which is typically defined by the outer rim of the collimating unit.

The light output unit 120 comprises a light source 121. The light source is in this exemplary embodiment a LED, but any suitable light source like a laser, an incandescent lamp or a CDM is applicable within the inventive concept and is considered to fall within the scope of the invention. The light source may be arranged anywhere within the light output unit 120. However, as previously mentioned, the light emitted from the light source 121 is outputted from the light output unit 120 via the light output surface 125.

The collimating unit 130 is typically some type of movably arranged collimating unit, like a curved reflective surface. However, the collimating unit may be realized by means of a movably arranged light guide, lens, or combination of optical components etc., which is arranged to receive light and adjust the direction of the light being outputted from the light output unit 120. The collimating unit 130a is in the exemplary embodiment of FIG. 1 a hollow cylinder, which is at least mainly closed in one end. Further, the collimating unit is open in the opposite end, thereby defining a light exit area. An adjustment element, which here comprises a slit 129, is arranged at the closed end, in which a portion of the light output unit 120 is passed through such that the collimating unit 130a encompasses the light output surface 125. The slit 129 further allows for pivotal adjustment of the collimating unit 130a. The collimation unit 130a is further pivotally arranged at the light output unit, and the pivotal movement is guided by the slit 129. The slit 129 may in other embodiments be an aperture of another shape, e.g. circular. The actual pivot, or rotation point, depends on the arrangement. It should also be noted that the adjustment element comprises means for fixating the collimation unit in the adjusted direction (not shown), e.g. by means of mechanical resistance, gearbox, stepper or servo motor (computer driven). In the latter examples of the adjustment element a control unit is utilized to control the movement of the collimating unit to adjust the direction of the light emitted from the light emitting device. Further, the control unit may be arranged in combination with a driver for controlling the amount of light, the color of the light, operation time, or combinations thereof of the device. Several light emitting devices may advantageously be driven and controlled in a lighting system.

As previously described the functionality of the collimating unit is to receive and collimate light from the light output unit 120 and since the collimating unit is adjustable the direction of the light beam being outputted from the device may be controlled into a desired direction.

In alternative embodiments of the light emitting device, the adjusting element may in addition to the pivotal movement in one direction as described above, be arranged to allow a 360 degree rotational movement. Further, in the exemplifying embodiment above, the slit 129 is symmetrically arranged on the closed end of the cylindrically shaped collimating unit to guide the movement of the collimating unit such that a pivotal movement in a predetermined direction is allowed. This slit may also be asymmetrically arranged or have for instance a predetermined curved profile to provide a desired guiding of the movement of the collimating unit.

The base unit 110 typically comprises the electrical means for powering and control of the device. Further, the base unit will typically comprise means for cooling the light source, i.e. any suitable heat sink with free convection, forced convection, liquid cooling, electrical cooling, or any combination thereof is arranged in connection to the base unit 110.

In an alternative embodiment, the light emitting device comprises control means to control the positioning of the one or more collimating unit(s) 130. The control means may comprise a motor for moving the collimation unit, a control device for controlling the motor and optionally communication means for remote control of the collimating unit 130.

In an alternative embodiment a common base unit may be arranged with a plurality of light output units 120, each provided with a separate movable collimating unit.

Figure 1B:
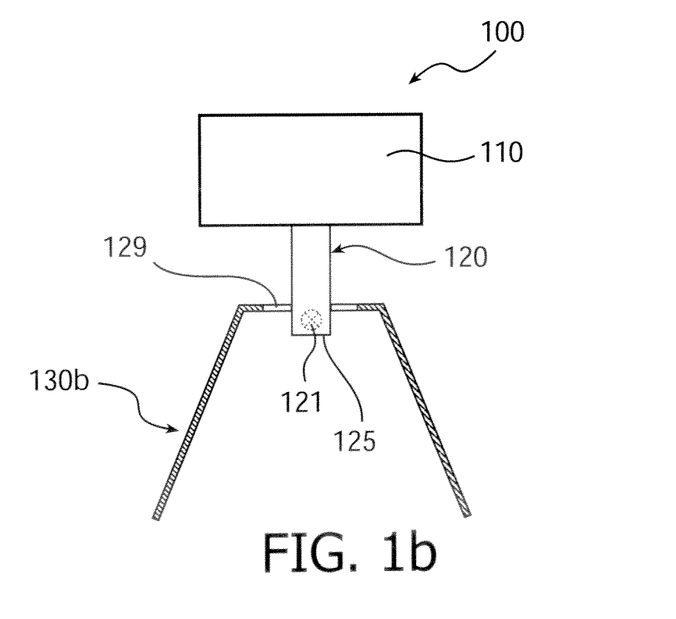

Referring now to FIG. 1b, another embodiment of the light emitting device 100 is illustrated in a cross sectional view. The basic structure of the embodiment is similar to the structure of the exemplary embodiment above. However, here the light source 121 is placed at the light output surface 125. The collimating unit 130b is shaped as a truncated cone which is substantially closed in one end and open in the opposite end. The shape of the collimating unit may in other embodiments be square shaped, bell shaped, triangular etc. (not shown). Embodiments showing a substantially parabolic collimating unit 130d are illustrated in FIGS. 2 to 4.

Figures 2A, 2B:
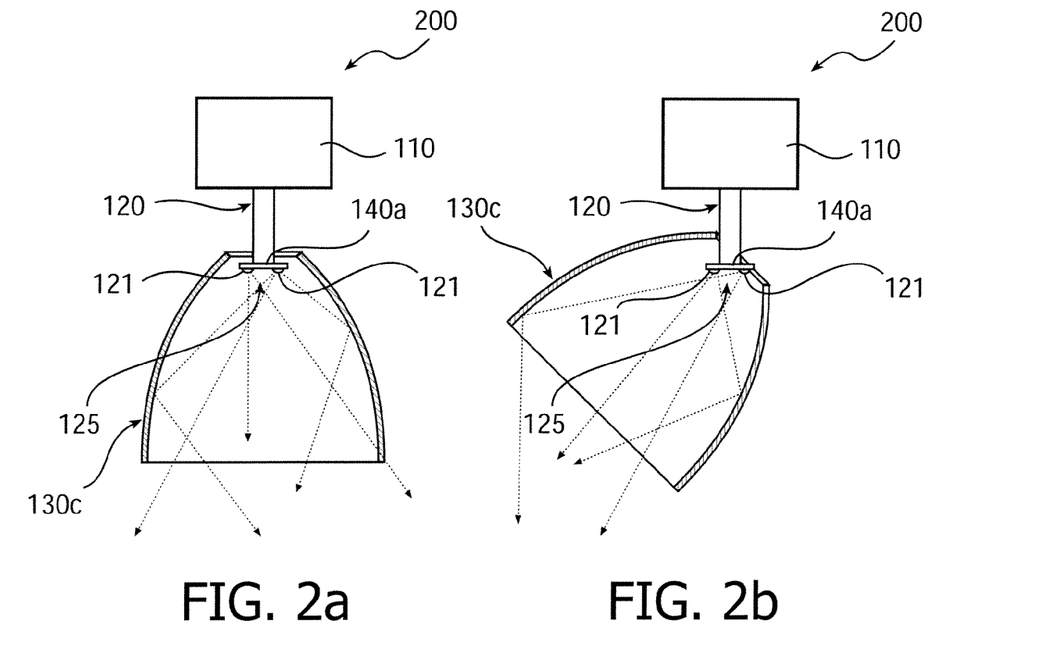
FIGS. 2a-b illustrate schematic cross sectional views of an embodiment of a light emitting device according to the present invention.

The light output unit 120 may further be arranged having a light source fixture 140. A light source fixture 140a of an embodiment 200 of the light emitting device is illustrated in FIGS. 2a and 2b. The light source fixture 140a is arranged such that it forms the light output portion 125, i.e. the light source fixture is arranged at the end of the light output unit 120 which is arranged inside the collimation unit 130c. The light source fixture 140a is arranged as a circular plate onto which plate light sources 121 in the form of sixteen rebel light emitting diodes, LEDs, 121 are mounted. The light sources 121 are symmetrically arranged on the circular plate, i.e. the light source fixture 140c. The light emitting device is typically arranged in a flat ceiling, having the light output unit 120 aligned with a vertical line. In FIG. 2a the tilting angle (pivotal angle) of the collimation unit 130c with respect to the vertical line is 0 degrees, while in FIG. 2b, the tilting angle of the collimation unit 130c with respect to the vertical line is 45 degrees (it may be larger). The collimating unit is in this exemplifying embodiment 10 cm long and has an inner diameter of 6 cm.

Figure 6A:
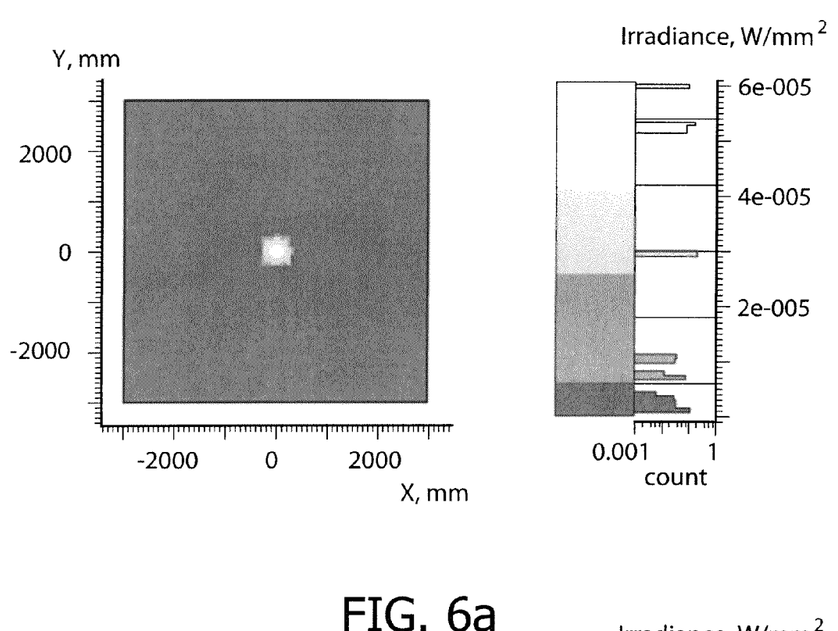
FIGS. 6a-b illustrate light intensity distributions for an embodiment of a light emitting device according to the present invention.
Figure 6B:
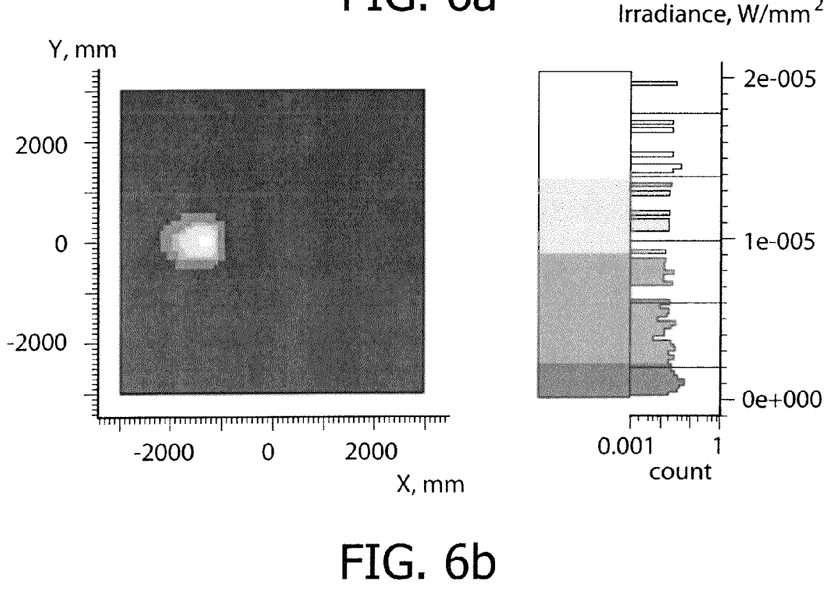

FIGS. 6a-b illustrate ray tracing calculations for this embodiment 200. The outputted light beam spot for a flat surface, e.g. a floor, which is at a vertical distance of 140 cm away from the light emitting device 200 is calculated. As can be deducted from these calculations, the maximum illuminance value for the spot in FIG. 6b, i.e. for the tilting angle 45 degrees, is lower due to the tilting angle of 45 degrees. The tilting angle causes the spot to project a conic section. Further, the tilting angle causes a 1.4 times a longer path for the light beam to the floor. The longer path for this tilting angle and the distance to the floor leads to a theoretical factor of 2.8 lower illuminance value in the center of the beam spot in FIG. 6b, which is approximately obtained in the ray trace calculation. Furthermore, the light beam spot in the FIG. 6b shows some asymmetry which is caused by the positioning of the LEDs, which are not all located in an optimal position. The positioning of the LEDs may be optimized by adjusting the shape of the collimation unit 130c, and/or the point of pivotal movement of the collimating unit. Alternatively, the positions of the LEDs may be adjusted, as is discussed in the next sections.

Figure 3A:
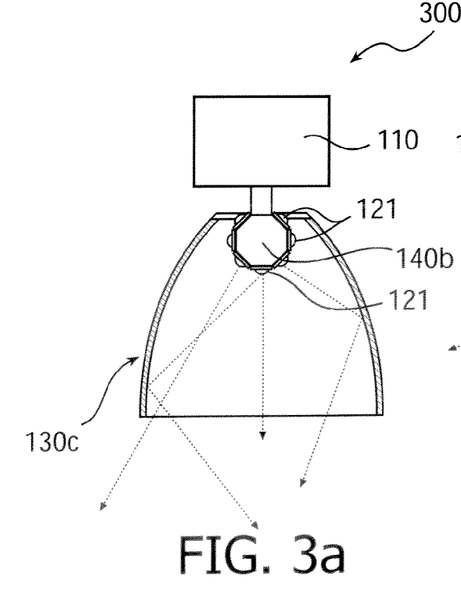
FIGS. 3a-b illustrate schematic cross sectional views of an embodiment of a light emitting device according to the present invention.
Figure 3B:
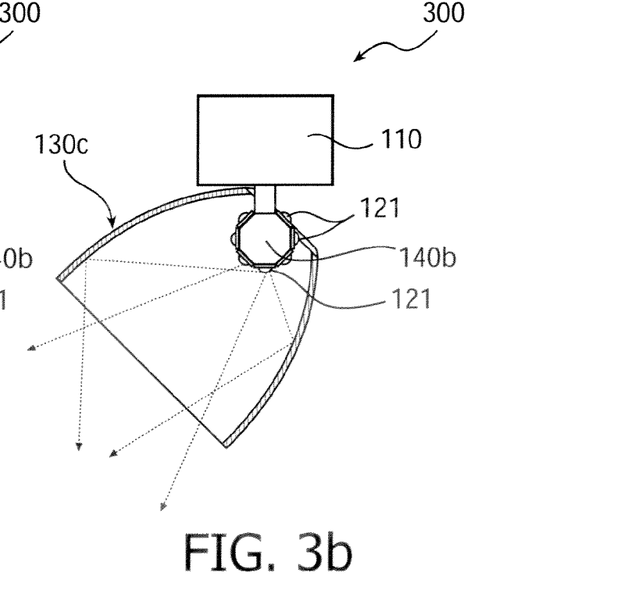

In an embodiment of the light emitting device, as illustrated in FIGS. 3a-b, the light source fixture 140b is spherical, such that the light sources 121, LEDs, are rotational symmetrically arranged. This virtually eliminates the asymmetry of the beam spot as discussed above (asymmetry caused by the beam striking the surface under an angle may still be present). Since LEDs are arranged in any direction, the tilting direction of the collimator unit 130c becomes less crucial for the outputted light.

Figure 4A:
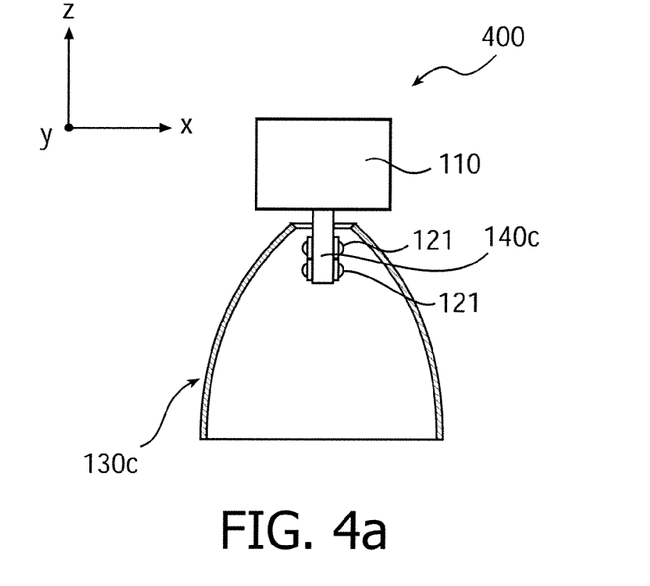
FIG. 4a illustrates a schematic cross sectional view of an embodiment of a light emitting device according to the present invention.
Figure 4B:
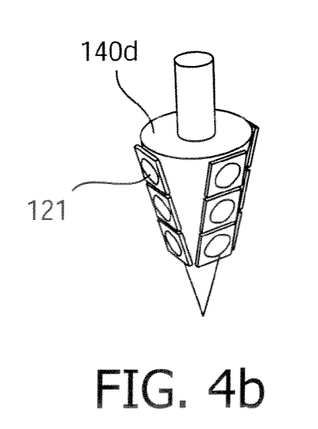
FIGS. 4b-d illustrate schematic perspective views of a light source fixture on a respective embodiment of a light emitting device according to the present invention.
Figure 4C:
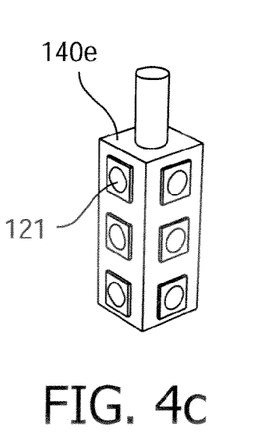
Figure 4D:
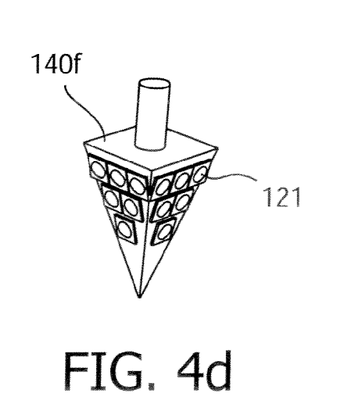

FIGS. 4a-d illustrate yet other embodiments of the light emitting device having different light source fixtures: FIG. 4a illustrates a cylindrical light source fixture 140c with LEDs arranged on two opposite sides. FIG. 4b illustrates a cone shaped rectangular light source fixture 140d, having the base of the cone arranged towards the base unit 110 (not shown), and light sources 121 at least partly covering the surface of the cone. FIG. 4c illustrates a light source fixture 140e which is rectangular. Light sources 121 are arranged on the sides of the rectangle. FIG. 4d illustrates a light source fixture 140f showing a pyramid shape, and which has the base of the pyramid arranged towards the base (not shown). The sides of the pyramid are arranged with light sources 121.

In an embodiment of the light emitting device, the light output unit is allowed to rotate around the vertical axis. This is advantageous for the embodiment 400 shown in FIG. 4a. The light source fixture 140c is arranged having light sources 121 mounted at two vertical sides, such that the light sources 121 emit light in two main directions which are opposite to each other (left and right along the x-axis in FIG. 4a). The collimating unit is allowed to tilt along the y-axis of the drawing. The base unit together with the collimator are allowed to rotate along the vertical (z-axis) at the same rate.

Thus, the shape of the light beam being outputted from the light emitting device 400 is essentially unchanged whatever rotation is made.

In an embodiment of the light emitting device, the light emitting device further comprises a reflector (not shown) arranged at the base unit. The reflector may be arranged by applying a reflecting material onto an outer surface of the base unit 110 which faces the collimating unit, or by being incorporated in the assembly as a sub part in the device, e.g. as a reflecting parabolic component arranged to encompass the interface between the light output unit 120 and the base unit 110. This is advantageous for reflecting any stray light through the aperture of the collimating unit and for improving the appearance of the light lamp/luminaire.

Figure 5A:
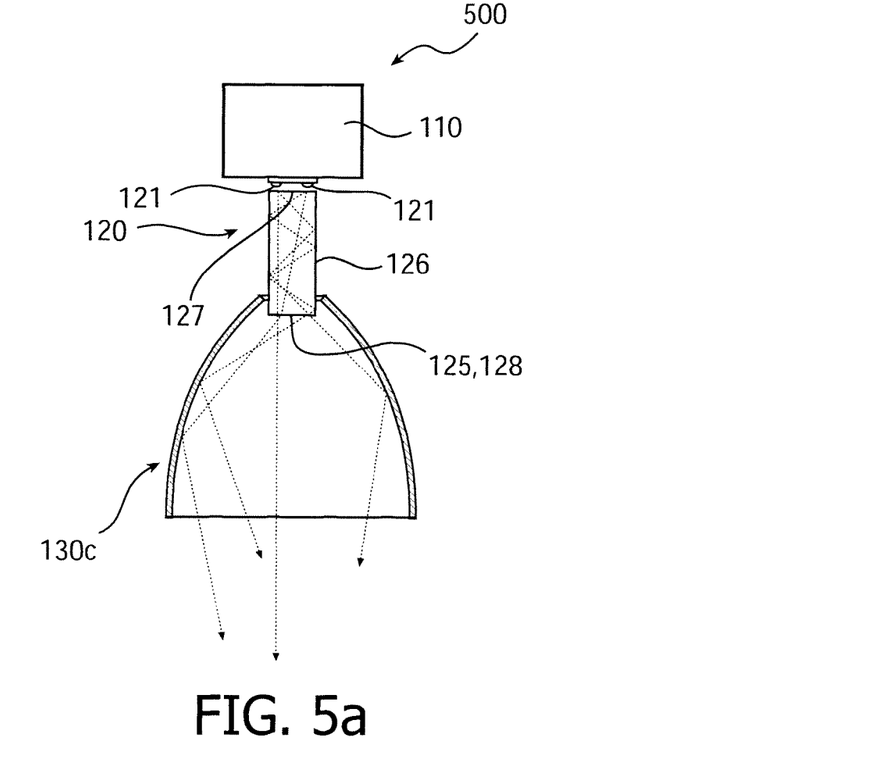
FIGS. 5a-b illustrate schematic cross sectional views of a respective embodiment of a light emitting device according to the present invention.

In an embodiment of the light emitting device, as illustrated in FIG. 5*a*, the light emitting device 500 comprises a base unit 110, a light output unit 120 and a collimating unit 130*c*. The light output unit 120 is arranged having the light sources 121, LEDs, arranged at the base unit 110. The base unit 110 comprises a heat sink. The mounting of the light sources at the vicinity of the heat sink is advantageous since the efficiency of the heat transfer from the light sources to the heat sink increases. The light output unit 120 further comprises a light mixing rod 126, having a first end 127 arranged at the light sources 121 to receive the emitted light. Light emitted from the light sources 121 is guided through the mixing rod 126 and outputted via the second end 128 of the light mixing rod 126. Thus, the second end 128 of the light emitting rod forms the light output portion 125 of the light output unit 120.

The second end 128 of the light mixing rod 126 is here flat. Other shapes are possible. In another embodiment the second end 128 is arranged to be cone shaped, pyramid shaped and facetted, see FIG. 5*b*.

Figure 5B:
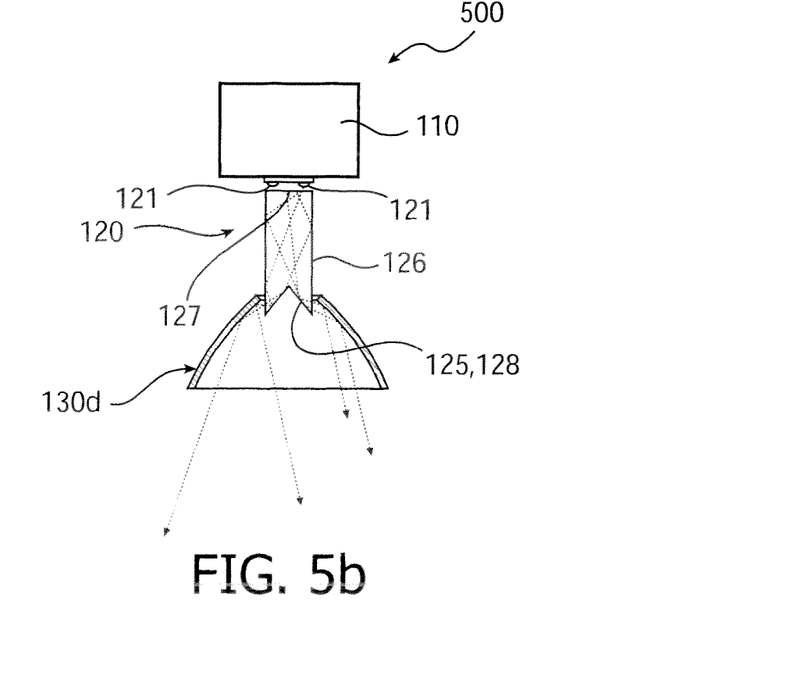

The light emitting device 500, in FIG. 5*b*, is arranged having a facetted second end on the light mixing rod 126. This output portion 125 provides a light output in a radial direction with respect to the extension of the mixing rod, which highly ensures that substantially all of the mixed light hits the inner walls of the collimating unit 130*d*. This allows for a shorter length of the collimating unit 130 with retained light output illuminance, as compared to the embodiment of the light emitting device with a flat second end of the light mixing rod. The length of the collimating unit 130*d* is shorter than for the collimating unit 130*c* in the embodiment as illustrated in FIG. 5*a*.

In an alternative embodiment, the light emitting device is arranged to be recessed in a surface, e.g. a ceiling or a wall. Further, the base unit of the device is arranged to be shifted with respect to the collimating unit along a plane parallel to the surface during the adjustment of the collimating unit (not shown). Alternatively the base unit can in addition also shift along a vertical axis. The shifting of the position of the base unit is made in order to counterbalance the shifting of the light exit area of the collimating unit with respect to the surface, such that the total amplitude of the shifting of the light exit area during adjustment of the direction of the light is decreased (or alternatively completely counterbalanced). As the shifting of the light exit area is decreased, the recess area in the surface may be decreased. The shifting of the base unit with respect to the light output portion is also advantageous for an externally arranged light emitting device, as it allows for changing the direction of the outputted light, while having a fixated position of the light exit area with respect to the ceiling.

Above, embodiments of the light emitting device according to the present invention as defined in the appended claims have been described. These should be seen as merely non-limiting examples. As understood by a skilled person, many modifications and alternative embodiments are possible within the scope of the invention.

It is to be noted, that for the purposes of this application, and in particular with regard to the appended claims, the word "comprising" does not exclude other elements or steps, that the word "a" or "an", does not exclude a plurality, which per se will be apparent to a person skilled in the art.

The invention claimed is:

1. A light emitting device comprising:
a base unit;
a light output unit being engaged with said base unit, said light output unit comprising at least one LED light source for emitting light;
a movably arranged collimating unit for adjusting the direction of the emitted light;
said at least one light output unit maintained in a substantially fixed position relative to said base;
said light output portion distanced from said base;
said collimating unit arranged to be tiltable with regard to said light output unit;
wherein said light output unit comprises a light output portion for outputting light emitted from said light source, and wherein said collimating unit is arranged to encompass said light output portion; and
wherein said light output unit further includes a mixing rod having a first end arranged at said at least one light source and a second end fond said output portion.

2. A light emitting device according to claim 1, wherein, in combination, said collimating unit, said base unit, and said light output unit are arranged to be rotatable.

3. A light emitting device according to claim 1, wherein said collimating unit is one of truncated cone, cylinder shaped, square shaped, and triangular.

4. A light emitting device according to claim 1 wherein said base unit comprises a heat sink arranged for dissipating heat from said at least one light source.

5. A light emitting device according to claim 1, wherein said movably arranged collimating unit defines an aperture providing an asymmetric predefined path for the movement of said collimating unit.

6. A light emitting device according to claim 5, further comprising a reflector arranged at said base unit.

7. A light emitting device according to claim 5, further comprising a control unit for controlling the movement of said collimating unit, the amount of light, or the color of the light from said light emitting device, or combinations thereof.

8. A light emitting device according to claim 1, wherein said base unit is arranged to be shifted during movement of the collimating unit for adjusting the direction of the emitted light.

9. A light emitting device comprising:
a base unit;
a light output unit being engaged with said base unit, said light output unit comprising at least one LED light source for emitting light;
a movably arranged collimating unit for adjusting the direction of the emitted light;
said at least one light output unit maintained in a substantially fixed position relative to said base;
said light output portion distanced from said base;
said collimating unit is arranged to be tiltable with regard to said light output unit;
wherein said light output unit comprises a light output portion for outputting light emitted from said light source, and wherein said collimating unit is arranged to encompass said light output portion;

wherein, in combination, said collimating unit, said base unit, and said light output unit are arranged to be rotatable; and wherein said light output unit further comprises a mixing rod having a first end arranged at said at least one light source, and a second end forming said light output portion.

10. A light emitting device according to claim 9, wherein said second end is arranged to be one of cone shaped, pyramid shaped, and facetted.

11. A light emitting device comprising:

a base unit;

a light output unit being engaged with said base unit, said light output unit comprising at least one LED light source for emitting light;

a movably arranged collimating unit for adjusting the direction of the emitted light;

said at least one light output unit maintained in a substantially fixed position relative to said base;

said light output portion distanced from said base;

said collimating unit is arranged to be tiltable with regard to said light output unit;

wherein said light output unit comprises a light output portion for outputting light emitted from said light source, and wherein said collimating unit is arranged to encompass said light output portion;

wherein, in combination, said collimating unit, said base unit, and said light output unit are arranged to be rotatable;

wherein said light output unit further comprises a mixing rod having a first end arranged at said at least one light source, and a second end forming said light output portion; and wherein a plurality of said light sources are rotational symmetrically arranged on said light emitting device.

12. A light emitting device according to claim 11, wherein a plurality of said light sources are arranged at least partly covering a surface of the light emitting device, wherein said light emitting device is arranged having the shape of one of a sphere, a pyramid, a rectangle, and a cone.

* * * * *